March 10, 1936.  G. H. WALKER  2,033,747
APPARATUS FOR IMPARTING VIBRATORY MOVEMENTS TO MOTOR VEHICLES
Filed April 17, 1934  2 Sheets-Sheet 1

INVENTOR
G. H. Walker

March 10, 1936. G. H. WALKER 2,033,747
APPARATUS FOR IMPARTING VIBRATORY MOVEMENTS TO MOTOR VEHICLES
Filed April 17, 1934 2 Sheets-Sheet 2
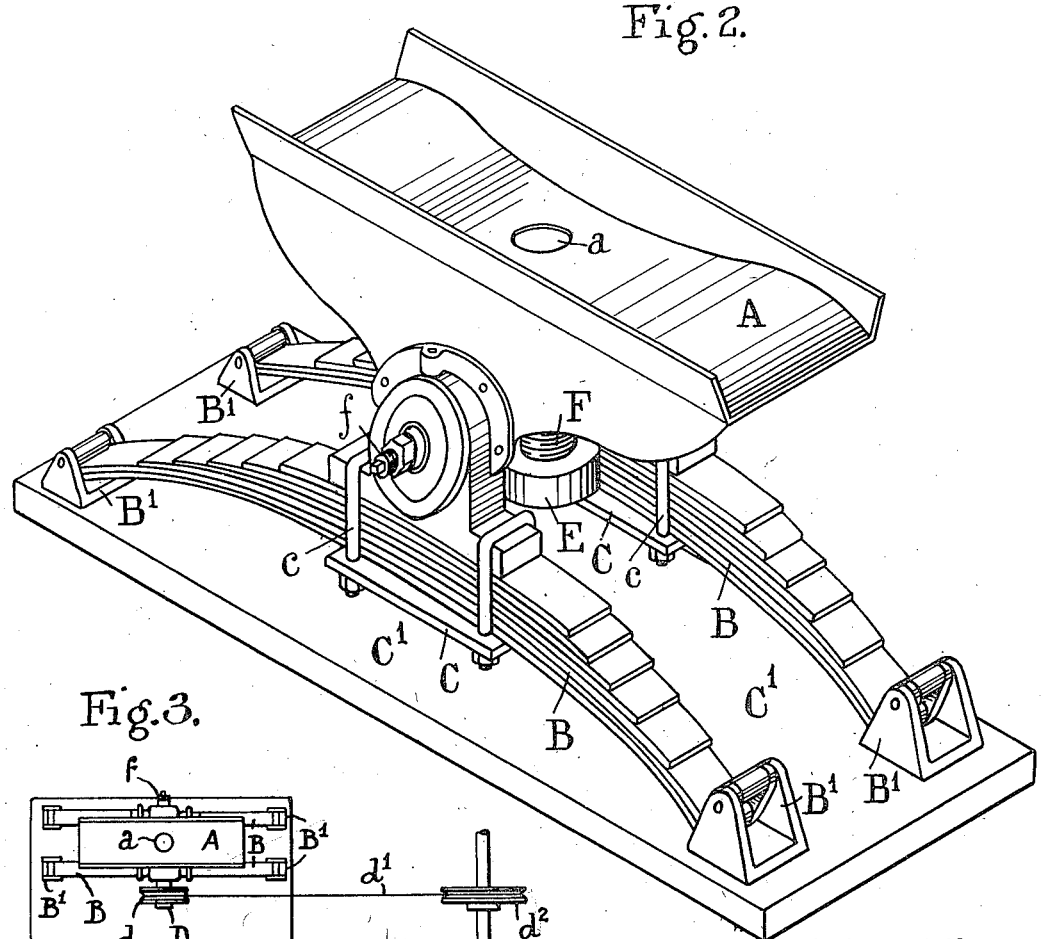
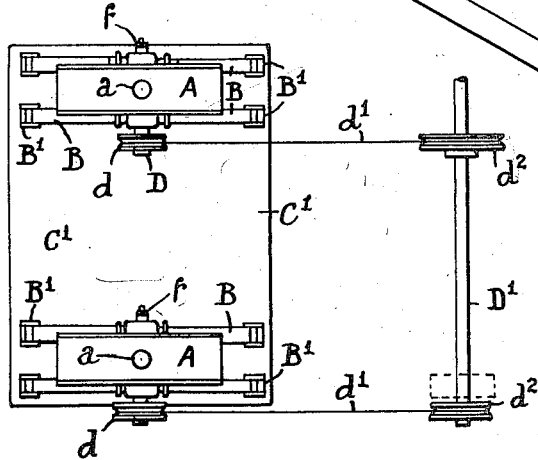
INVENTOR.
G. H. Walker Patented Mar. 10, 1936

2,033,747

UNITED STATES PATENT OFFICE 2,033,747

APPARATUS FOR IMPARTING VIBRATORY MOVEMENTS TO MOTOR VEHICLES

George Henry Walker, Worcester, England, assignor to Heenan & Froude Limited, Worcester, England Application April 17, 1934, Serial No. 720,983
In Great Britain May 6, 1933

5 Claims. (Cl. 73—51)

This invention relates to improvements in apparatus for imparting vibration to the chassis and/or bodies of motor vehicles with the object of tracing or investigating faults in construction, noises or other faults or characteristics thereof.

The apparatus comprises a cradle which supports wheel or wheels of the vehicle to be tested carried by springs mounted on a rigid underframe or base plate and supporting an unbalanced rotating shaft driven by suitable means preferably external to the device whereby a vibratory movement is imparted to the device and to the vehicle supported thereon.

Another feature of the invention consists in the means for obtaining the unbalance of the rotating shaft by which the degree of unbalance can be adjusted as desired.

The invention will be described with reference to the accompanying drawings in which:—

Fig. 2 is a perspective view of same.

Fig. 3 is a diagrammatic plan showing the employment of two vibrating heads.

Figure 1:
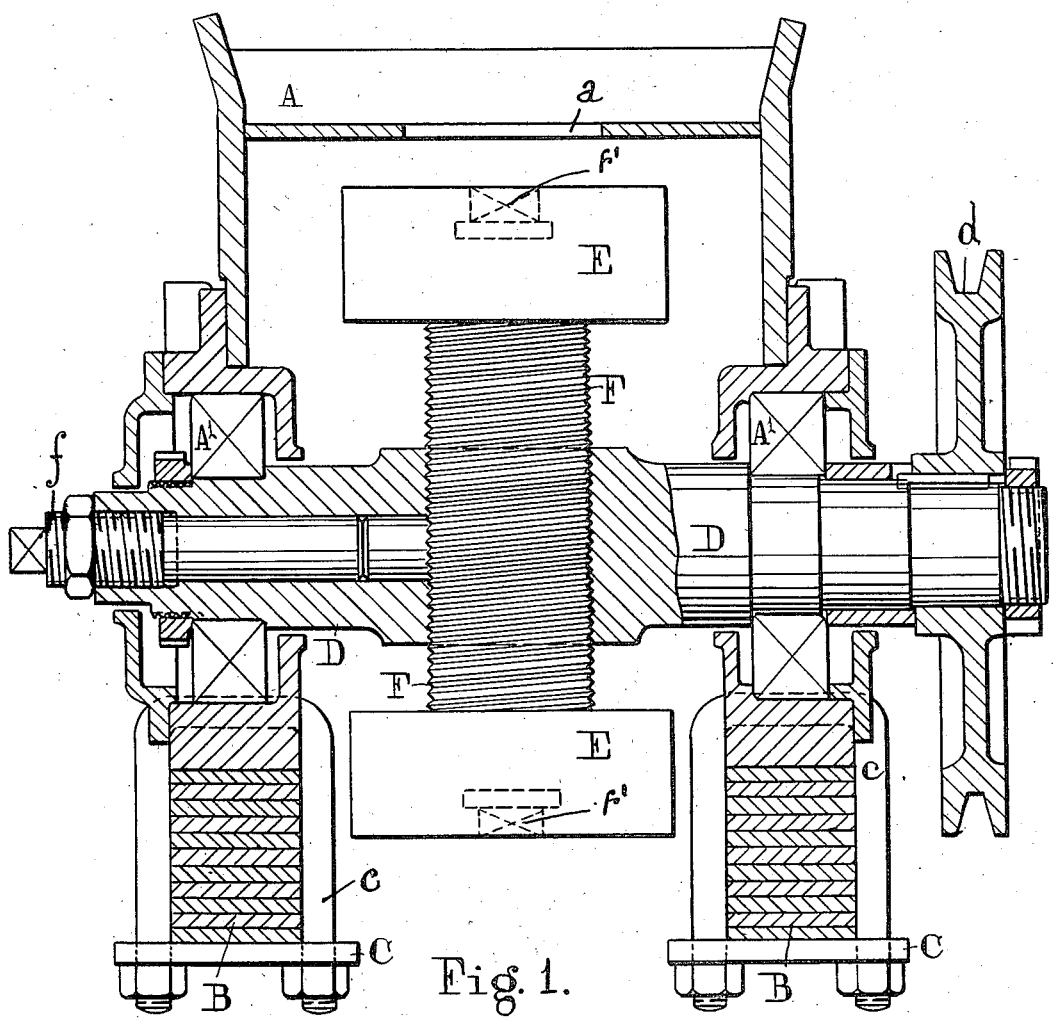
Fig. 1 is a vertical transverse section through the apparatus.

The vibrating head is adjustable for a fixed amount of unbalance i. e. the adjustment for unbalance is made while the machine is stationary and comprises a trough or cradle A, capable of supporting a wheel, axle or other part of the vehicle, mounted on the leaf or plate springs B secured at each end by shackles $B^1$ to a rigid underframe or base plate $C^1$. The trough or cradle A is mounted on the springs B by the U bolts $c$ and plates C. The lower part of the trough or cradle A is provided with bearings $A^1$ for an unbalanced shaft D adapted to be rotated by a pulley $d$ on one end thereof, the unbalanced state of the shaft being caused by mounting one or more flyweights E thereon.

Each flyweight E has its centre of gravity substantially removed from the axis of rotation of the shaft D and each is capable of being moved in relation to the shaft by being mounted on a screw F at right angles to the axis of the shaft D. Thus by suitably proportioning the flyweights E it can be arranged that in one position they are in approximate static or dynamic balance but by rotating the screw F in the shaft D from its central position, an unbalanced effect is introduced, becoming a maximum when the centres of gravity of the respective weights lie one as near as possible to the shaft D and the other as far as possible therefrom. The position of the screw F in the shaft D is adjusted by the use of a box key engaging a squared end $f^1$ on the end of the the screw F. The box key is inserted through an aperture $a$ in the trough or cradle A.

A locking device, as for example a setscrew or bolt $f$ is provided for locking the screw F and consequently the flyweights E in any desired position.

If desired a vibrating head may be mounted under more than one wheel of the vehicle in which case the flyweights E are driven at slightly differing speeds of rotation and when two or more heads running at slightly different speeds are employed the degree of vibration gradually increases from a minimum to a maximum and then gradually dies away this behaviour being repeated periodically at regular intervals.

The rotating shaft D or the shafts D, D may be driven from any convenient source of power through gearing, shafting, or flexible cable but it is preferred to employ a small or V belt $d^1$ driving from a pulley $d^2$ mounted on a shaft $D^1$ carried externally to the vibrating devices to a similar pulley fixed on the rotating shaft. Where two or more heads are employed the pulleys $d^2$ on the shaft $D^1$ are of different dimensions (see Fig. 3).

If desired each shaft D may be driven by an independent motor, the speed of which can be controlled at will so that both the motors may be running at similar or differing speeds at the will of the operator. A speedometer showing the frequency of vibration is connected by flexible cable or other convenient means to each of the rotating shafts.

The vibrating devices are preferably arranged below floor level so that the wheels of the vehicle may be driven conveniently into the testing position, or they may be mounted above floor level with ramps and platforms arranged between units of the vibrating devices. Vibrating devices arranged in pairs may either be sufficiently wide to take vehicles having a variety of dimensions of wheel track, or they may be adjustable sideways relatively to each other in order to accommodate such variations.

If the vibrating devices are arranged beneath the front and rear parts of the vehicle simultaneously, they are made adjustable as to wheelbase. A convenient manner of obtaining such adjustment is to arrange one pair of vibrating devices on a trolley, the wheels of which run on rails and are capable of being locked securely at any desired distance from the remaining vibrating devices.

What I claim as my invention and desire to protect by Letters Patent is:—

1. Apparatus for imparting vibration through the wheels to motor vehicles for the purpose of testing for faults therein comprising a bedplate, a pair of leaf springs mounted on the bedplate, a shaft, bearings in which the shaft is journalled carried by the springs, a cradle for a vehicle wheel mounted on the bearings, a screwed spindle passing transversely through the shaft, flyweights mounted thereon by which a varying degree of out of balance may be imparted to the shaft and means for rotating the shaft.

2. Apparatus for imparting vibration through the wheels to motor vehicles for the purpose of testing for faults therein comprising a bedplate, a pair of leaf springs mounted on the bedplate, a shaft, bearings in which the shaft is journalled carried by the springs, a cradle for a vehicle wheel mounted on the bearings, a screwed spindle passing transversely through the shaft, flyweights mounted thereon by which a varying degree of out of balance may be imparted to the shaft and a pulley mounted on the shaft by which it is rotated.

3. Apparatus for imparting vibration through the wheels to motor vehicles for the purpose of testing for faults therein comprising a bedplate, a pair of leaf springs mounted on the bedplate, a shaft, bearings in which the shaft is journalled carried by the springs, a cradle for a vehicle wheel mounted on the bearings, a screwed spindle passing transversely through the shaft, flyweights mounted thereon by which a varying degree of out of balance may be imparted to the shaft, a locking device for locking the screwed spindle and flyweights in position and means for rotating the shaft.

4. Apparatus for imparting vibration through the wheels to motor vehicles for the purpose of testing for faults therein comprising a bedplate, a pair of leaf springs mounted on the bedplate, a shaft, bearings in which the shaft is journalled carried by the springs, a cradle for a vehicle wheel mounted on the bearings, a screwed spindle passing transversely through the shaft, flyweights mounted thereon by which a varying degree of out of balance may be imparted to the shaft, a set screw passing longitudinally through the shaft to lock the screwed spindle and flyweights in position and a pulley mounted on the shaft by which it is rotated.

5. Apparatus for imparting vibration to motor vehicles through the wheels as in claim 1 in combination with a second similarly disposed vibrating head supporting a second wheel of the vehicle the speed of rotation of the two shafts being different to provide a periodically changing degree of vibration which increases from a minimum to a maximum and vice versa at regular intervals.

GEORGE HENRY WALKER.